(12) United States Patent
Haveliwala et al.

(10) Patent No.: US 9,058,364 B2
(45) Date of Patent: Jun. 16, 2015

(54) VARIABLE PERSONALIZATION OF SEARCH RESULTS IN A SEARCH ENGINE

(75) Inventors: Taher H. Haveliwala, Fremont, CA (US); Glen M. Jeh, San Francisco, CA (US); Sepandar D. Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/620,611

(22) Filed: Sep. 14, 2012

(65) Prior Publication Data

US 2013/0103683 A1  Apr. 25, 2013

Related U.S. Application Data

(63) Continuation of application No. 13/464,083, filed on May 4, 2012, now Pat. No. 8,874,567, which is a continuation of application No. 12/720,479, filed on Mar. 9, 2010, now Pat. No. 8,180,776, which is a (Continued)

(51) Int. Cl.
  *G06F 17/30* (2006.01)
(52) U.S. Cl.
  CPC ...... *G06F 17/3053* (2013.01); *G06F 17/30867* (2013.01); *Y10S 707/99936* (2013.01)
(58) Field of Classification Search
  CPC .................................................. G06F 17/3053
  USPC ................. 707/707, 708, 710, 733, 734, 738, 707/999.003, 999.006, 748–750
  See application file for complete search history.

(56) References Cited

U.S. PATENT DOCUMENTS

| 5,724,521 | A | 3/1998 | Dedrick |
| 5,724,567 | A | 3/1998 | Rose et al. |
| 5,754,938 | A | 5/1998 | Herz et al. |
| 5,754,939 | A | 5/1998 | Herz et al. |

(Continued)

FOREIGN PATENT DOCUMENTS

| EP | 1050830 A2 | 11/2000 |
| WO | WO 01/44992 A2 | 6/2001 |

(Continued)

OTHER PUBLICATIONS

Aggarwal, C. et al. "A Framework for the Optimizing of the WWW Advertising," International IFIP Working Conference on Electronic Commerce, 1998, Hamburg, Germany, published in Trends in Distributed Systems for Electronic Commerce, edited by W. Lamersdorf and M. Merz, Springer Verlag Lecture Notes in Computer Science, 1998, pp. 1-10, vol. 1402.

(Continued)

*Primary Examiner* — Marc Filipczyk
(74) *Attorney, Agent, or Firm* — Fish & Richardson P.C.

(57) ABSTRACT

A search engine provides personalized rankings of search results. A user interest profile identifies topics of interest to a user. Each topic is associated with one or more sites, and a boost value, which can be used to augment an information retrieval score of any document from the site. Search results from any search are provided to the user, with a variable control of the ranking of the results. The results can be ranked by their unboosted information retrieval score, thus reflecting no personalization, or by their fully or partially boosted information retrieval scores. This allows the user to selectively control how their interests affect the ranking of the documents.

21 Claims, 14 Drawing Sheets

Related U.S. Application Data continuation of application No. 11/002,474, filed on Dec. 1, 2004, now Pat. No. 7,716,223.

(60) Provisional application No. 60/557,783, filed on Mar. 29, 2004.

(56) References Cited

U.S. PATENT DOCUMENTS

| | | | |
|---|---|---|---|
| 5,778,363 A | 7/1998 | Light | |
| 5,809,242 A | 9/1998 | Shaw et al. | |
| 5,887,133 A | 3/1999 | Brown et al. | |
| 5,946,678 A | 8/1999 | Aalbersberg | |
| 6,012,053 A | 1/2000 | Pant et al. | |
| 6,112,202 A | 8/2000 | Kleinberg | |
| 6,134,532 A | 10/2000 | Lazarus et al. | |
| 6,137,911 A | 10/2000 | Zhilyaev | |
| 6,138,113 A | 10/2000 | Dean et al. | |
| 6,182,068 B1 | 1/2001 | Culliss | |
| 6,285,999 B1 | 9/2001 | Page | |
| 6,289,342 B1 | 9/2001 | Lawrence et al. | |
| 6,308,202 B1 | 10/2001 | Cohn et al. | |
| 6,327,574 B1 | 12/2001 | Kramer et al. | |
| 6,327,590 B1 | 12/2001 | Chidlovskii et al. | |
| 6,356,898 B2 | 3/2002 | Cohen et al. | |
| 6,360,221 B1 | 3/2002 | Gough et al. | |
| 6,366,298 B1 | 4/2002 | Haitsuka et al. | |
| 6,370,527 B1 | 4/2002 | Singhal | |
| 6,385,592 B1 | 5/2002 | Angles et al. | |
| 6,385,619 B1 | 5/2002 | Eichstaedt et al. | |
| 6,449,657 B2 | 9/2002 | Stanbach, Jr. et al. | |
| 6,560,600 B1 | 5/2003 | Broder | |
| 6,584,468 B1 | 6/2003 | Gabriel et al. | |
| 6,601,061 B1 | 7/2003 | Holt et al. | |
| 6,665,656 B1 | 12/2003 | Carter | |
| 6,665,837 B1 | 12/2003 | Dean et al. | |
| 6,665,838 B1 | 12/2003 | Brown et al. | |
| 6,681,223 B1 | 1/2004 | Sundaresan | |
| 6,684,205 B1 | 1/2004 | Modha et al. | |
| 6,757,691 B1 | 6/2004 | Welsh et al. | |
| 6,772,200 B1 | 8/2004 | Bakshi et al. | |
| 6,789,076 B1 * | 9/2004 | Dutta | 707/765 |
| 6,799,176 B1 | 9/2004 | Page | |
| 6,871,202 B2 | 3/2005 | Broder | |
| 6,912,505 B2 | 6/2005 | Linden et al. | |
| 6,922,685 B2 | 7/2005 | Greene et al. | |
| 6,981,040 B1 | 12/2005 | Konig et al. | |
| 7,017,114 B2 | 3/2006 | Guo et al. | |
| 7,216,123 B2 | 5/2007 | Kamvar et al. | |
| 7,380,258 B2 * | 5/2008 | Durden et al. | 725/25 |
| 7,565,630 B1 * | 7/2009 | Kamvar et al. | 1/1 |
| 7,631,032 B1 | 12/2009 | Refuah et al. | |
| 7,716,223 B2 | 5/2010 | Haveliwala et al. | |
| 8,180,776 B2 | 5/2012 | Haveliwala et al. | |
| 2002/0024532 A1 | 2/2002 | Fables et al. | |
| 2002/0062323 A1* | 5/2002 | Takatori et al. | 707/514 |
| 2002/0078045 A1* | 6/2002 | Dutta | 707/7 |
| 2002/0099685 A1 | 7/2002 | Takano et al. | |
| 2002/0120619 A1 | 8/2002 | Marso et al. | |
| 2002/0123912 A1 | 9/2002 | Subramanian et al. | |
| 2002/0198882 A1 | 12/2002 | Linden et al. | |
| 2003/0018659 A1 | 1/2003 | Fuks et al. | |
| 2003/0037041 A1 | 2/2003 | Hertz | |
| 2003/0088562 A1 | 5/2003 | Dillon et al. | |
| 2003/0115318 A1 | 6/2003 | Wueste | |
| 2003/0204502 A1 | 10/2003 | Tomlin et al. | |
| 2003/0208478 A1 | 11/2003 | Harvey | |
| 2003/0208482 A1 | 11/2003 | Kim et al. | |
| 2003/0233345 A1 | 12/2003 | Perisic et al. | |
| 2004/0024752 A1 | 2/2004 | Manber et al. | |
| 2004/0044571 A1 | 3/2004 | Bronnimann | |
| 2004/0073485 A1 | 4/2004 | Liu et al. | |
| 2004/0249709 A1 | 12/2004 | Donovan et al. | |
| 2005/0038775 A1 | 2/2005 | Haveliwala et al. | |

FOREIGN PATENT DOCUMENTS

| | | |
|---|---|---|
| WO | WO 01/63472 A2 | 8/2001 |
| WO | WO 03/107127 A2 | 12/2003 |
| WO | WO 2005/033979 | 4/2005 |

OTHER PUBLICATIONS

Barroso, L.A. et al. "Web Search for a Planet: The Google Cluster Architecture," IEEE Micro, Mar.-Apr. 2003, pp. 22-28.

Bohté, Sander M. et al. "On Current Technology for Information Filtering and User Profiling in Agent-Based Systems, Part I: A Perspective", CWI, Centre for Mathematics and Computer Science, Jan. 2000, pp. 1-12.

Brin, S. et al. "The Anatomy of a Large-Scale Hypertextual Web Search Engine," Computer Networks and ISDN Systems, Apr. 1998, pp. 107-117, vol. 30, No. 1-7.

Carr, D.A., "Using Interaction Object Graphs to Specify Graphical Widgets," Dept. of Computer Science, Univ. of Maryland, Sep. 1994.

Cho, J. et al. "Efficient Crawing Through URL Ordering," Computer Networks and ISDN Systems, Apr. 1998, pp. 161-171, vol. 30, No. 1-7.

Cornelis, B. "Personalizing search in digital libraries" Jan. 2003, pp. 1-57. Retrieved from the Internet: http://citeseerx.ist.psu.edu/viewdoc/download?doi=10.1.1.129.7017&rep=rep1&type=pdf> [retrieved on Aug. 13, 2009].

Dumais, Susan et al. "Stuff I've Seen: A System for Personal Information Retrieval and Re-Use," SIGIR 03, Jul. 28-Aug. 1, 2003, pp. 108.

Communication pursuant to Article 94(3) for Application No. 05 725 981.4, dated Apr. 14, 2011, 5 pages.

Geiger, D. et al. "Asymptotic Model Selection for Directed Networks with Hidden Variables," May 1996, Technical Report MSR-TR-96-07, Microsoft Research, Advanced Technology Division.

Haveliwala, T.H et al, "An Analytical Comparison of Approaches to personalizing PageRank," Stanford University Technical Report, 2003-35, Jun. 20, 2003.

Haveliwala, T.H. "Topic-Sensitive PageRank: A Context-Sensitive Ranking Algorithm for Web Search," IEEE Transactions on Knowledge and Data Engineering, 2003.

Heckerman, D. et al. "Learning Bayesian Networks: The Combination of Knowledge and Statistical Data," Microsoft Research, Advanced Technology Division, Mar. 1994, pp. 1-53.

International Search Report re International Application No. PCT/US2004/026631, International Filing Date Aug. 13, 2004.

International Search Report for International Application No. PCT/US2005/025081, mailed Dec. 2, 2005.

Jeh, G. et al. "Scaling personalized web search", In Proceedings of the 12th International Conference on World Wide Web (Budapest, Hungary, May 20-24, 2003). WWW '03. ACM Press, New York, NY, pp. 271-279.

Jordan, M. et al. "Hidden Markov Decision Trees", 1997, Center for Biological and Computational Learning Massachusetts Institute of Technology and Department of Computer Science, University of Toronto, Canada, 7 pages.

Kohda, Y. et al. "Ubiquitous Advertising on the WWW: Merging Advertisement on the Browser," Fifth International World Wide Conference, May 6-10, 1996, pp. 1-9, Paris, France.

Langheinrich, M. et al. "Unintrusive Customization Techniques for Web Advertising," Computer Networks, 1999, pp. 1259-1272, vol. 31, No. 11-16.

Lawley, Elizabeth Lane, "Mamamusings", "MSR Presentations to Search Champs", http://mamamusings.net/archives/2004-10/05/msr_presentations_to_search champs, Oct. 5,2004, p. 1 of 1.

Liao, H.S. et al. "Browsing Unix Directories with Dynamic Queries; An Evaluation of Three Information Display Techniques," Technical Report CAR-TR-605 CS-TR-2841, Dept. of Computer Science, Univ. of Maryland, Feb. 1992.

Liu, F. et al. "Personalized 1-36 web search for improving retrieval effectiveness" IEEE Transactions on Knowledge and Data Engineering, IEEE Service Center, Los Alamitos, CA, vol. 16, No. 1, Jan. 1, 2004, pp. 28-40, XP011106912.

(56) References Cited

OTHER PUBLICATIONS

Marais, J. et al. "Supporting cooperative and personal surfing with a desktop assistant." Proceedings of ACM UIST'97, Oct. 1997.

Matthews, J., "Automating Ad Intelligence," Silicon Valley, Jul. 24, 2000, [online] Retrieved from the Internet>URL: http://siliconvalley.internet.com/news/article.php/3531_420651 <.

Meila, M. et al. "Estimating Dependency Structure as a Hidden Variable," Massachusetts Institute of Technology, A.I. Memo No. 1648, C.B.C.L. Memo No. 165, Sep. 1998.

Meng, W. et al. "Building Efficient and Effective Metasearch Engines," ACM Computing Surveys, Mar. 2002, pp. 48-49, vol. 34, No. 1.

Osada, M. et al. "AlphaSlider: Searching Textual Lists with Sliders," Dept. of Computer Science, Univ. of Maryland, Apr. 1993.

PCT International Search Report and Written Opinion, PCT/US05/09340, Jan. 31, 2007, 7 pages.

Pretschner, A. et al. "Ontology Based Personalized Search," Proc. $11^{th}$ IEEE Int. Conf. on Tools with Artificial Intelligence, Nov. 1999, pp. 391-398, Chicago.

Rosenstein, M. et al. "Recommending from Content: Preliminary Results from an E-Commerce Experiment," CHI 2000, published Apr. 16, 2000, The Hague, The Netherlands.

Supplementary European Search Report, European Patent Office Reference No. EPP95965, Aug. 31, 2009.

Weinburger, D. "Microsoft Research," Joho the Blog.www.hyperorg.com, Oct. 2, 2003, pp. 1-3.

Mladnic, Dunja Personal Webwatcher: Design and Implementation, Dept. for Intelligent Systems, J. Stefan Institute, Jamova 39, 11000 Ljubljana, Slovenia, 1996, 18 pages.

\* cited by examiner

Stanford Copyright & Fair Use Center
... Sign Up for Stanford's Fair Use Monthly Newsletter! It's FREE! ...
Stanford University Libraries, NOLO ... Books, Forms & amp; Software,
Justice - Peace, ...
fairuse.stanford.edu/ - 21k - Mar 28, 2004 - Cached Lawrence Lessig
... The Stanford Report, Stanford's official news service has posted its
coverage of last week's "The Ethics of P2P Filesharing" panel, ...
www.lessig.org/- 17k - Mar 28, 2004 - Cached Lawrence Lessig
... So the Stanford Center for Internet and Society has filed an action
on behalf of the Internet Archive and the Prelinger Archive
challenging unconditional ...
www.lessig.org/blog/- 57k - Mar 28, 2004 - Cached                               ⟩ 602

SRI International - an independent nonprofit R&D organization ...
... A pioneer since our founding in 1946 as Stanford Research Institute
(our name until 1977), SRI provides high-value solutions to a wide
range of government ...
www.sri.com/ - 11k - mar 28, 2004 - Cached

Stanford University Cardinal | An Official Athletic Site
Stanford Cardinal Official Athletic Site: complete timely
coverage of all Stanford sports including football, baseball &
basketball. ... 9 Stanford Downs No. ...
www.gostanford.com/ - 101k - Mar 28, 2004 - Cached

 Done        Internet

FIG. 6 (Cont.)

Stanford Encyclopedia of Philosophy
Stanford Encyclopedia of Philosophy. Edited by Edward N. Zalla
Editorial Information. |Link ... Principal Site: USA Stanford University.
Mirror ...
Plato.stanford.edu/ - 4k - Mar 28, 2004 - Cached Stanford University
Pictures of Standford University. Search Stanford Web People.
News & Events, ... Saturdays and Sundays at 2 pm. More Events.
Birds of Stanford, ...
www.stanford.edu/ - 24k - Mar 28, 2004 - Cached The Stanford Prison Experiment: A Simulation Study of the ...
Official web site of the Prison Experiment, a classic study
on the psychology of Imprisonment ... definitely worth a visit ...
www.prisonexp.org/ - 12k - Cached Stanford Artificial Intelligence Laboratory
Welcome to the Stanford AI Laboratory, Welcome to the Stanford
AI Lab! The Stanford AI Lab is back! After operating for more } 604
than ...
robotics.stanford.edu/ - 12k - Mar 28, 2004 - Cached Stanford Copyright & Fair Use Center
... Sign Up for Stanford's Fair Use Monthly Newsletter! It's FREE! ...
Stanford University Libraries, NOLO ... Books, Forms & amp; Software,
Justice - Peace, ...
fairuse.stanford.edu/ - 21k - Mar 28, 2004 - Cached

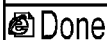 

FIG. 7 (Cont.)

CSLI Center for the Study of Language and Information - Stanford ...
The Center for the Study of Language and Information (CSLI) is an Independent Research Center founded in 1983 by researchers from Stanford University, SRI ...
www.csli.stanford.edu/ - 12k - Mar 28, 2004 - Cached The Stanford University Database Group
... You don't need to download and install the source ... a server runs at Stanford and a client on your machine. CLICK HERE to give it a try. On Nov. ...
www.db.stanford.edu/ - 8k - Cached EFF: Electronic Frontier Foundation and Stanford Law Clinic Sue ...
... For Immediate Release: Monday, November 3, 2003, Electronic Frontier Foundation and Stanford Law Clinic Sue Electronic Voting Company. ...
www.eff.org/Legal/ISP_liability/OPG_v_Diebold/20031103_eff_pr.php - 16k - Cached

Stanford - virtual sightseeing tours - showroom - ParallelGraphics ...
ParallelGraphics, home >> showroom >> virtual sightseeing tours >> Stanford. up to virtual sightseeing tours. Montmartre. Stanford.site search subscription: ...
www.parallelgraphics.com/showroom/virtual-tours/stanford/ - 18k - Mar 28, 2004 - Cached The Stanford SUIF Compiler Group
... 1994. Publications. Previous research. Affine Transformations for Optimizing Parallelism and Locality. stanford.edu / cs.stanford.edu / ee.stanford.edu.
Suif.stanford.edu/ - 3k - Cached

602

Internet

FIG. 8 (Cont.)

 OperaGlass
http://opera.stanford.edu/. Welcome to OperaGlass, an opera information server on the World Wide Web. ... My address is rick@rick.stanford.edu. ...
opera.stanford.edu/main.html - 7k - Cached

 Welcome to the STANFORD JAZZ WORKSHOP
Stanford Jazz Workshop offers innovative jazz education programs for adults and youth, the Stanford Jazz Festival and year-round jazz events featuring top ...
www.stanfordjazz.org/ - 21k - Cached

 The Stanford Harmonics
LA Weekend. The Harmonics just returned from Los Angeles after Participating in the 3rd annual California A Cappella Festival at UCLA. ...
www.stanfordharmonics.com/ - 15k - Cached
⎬ 602

Stanford University
Pictures of Stanford University. Search: Stanford Web People. News & Events, ... Saturdays and Sundays at 2 pm. More Events. Birds of Stanford, ...
www.stanford edu/ - 24k - Mar 28, 2004 - Cached The Martin Luther King, Jr. Papers Project
Stanford University, The King Center, Copyright Information Martin Luther King, Jr. Speaks Out on War and Peace Important information ...
www.stanford.edu/group/King/ - 15k - Cached Stanford Encyclopedia of Philosophy
Stanford Encyclopedia of Philosophy. Edited by Edward N. Zalla

Done Internet

FIG. 10 (Cont.)

VARIABLE PERSONALIZATION OF SEARCH RESULTS IN A SEARCH ENGINE

CROSS REFERENCE TO RELATED APPLICATIONS

This application is a continuation of, and claims priority to, pending U.S. patent application Ser. No. 13/464,083, filed on May 4, 2012, entitled "Variable Personalization of Search Results in a Search Engine," which is a continuation of, and claims priority to, U.S. patent application Ser. No. 12/720,479, filed on Mar. 9, 2010 and issued as U.S. Pat. No. 8,180,776, which claims the benefit of U.S. patent application Ser. No. 11/002,474, filed on Dec. 1, 2004 and issued as U.S. Pat. No. 7,716,223, which claims the benefit of U.S. Patent Application No. 60/557,783 filed on Mar. 29, 2004, which are both incorporated by reference herein. This application also incorporates by reference U.S. patent application Ser. No. 10/646,331 (filed on Aug. 22, 2003 and issued as U.S. Pat. No. 7,216,123) and Ser. No. 10/641,489 (filed on Aug. 14, 2003); all of the above applications are commonly owned along with this application.

FIELD OF INVENTION

This invention relates in general to online search engines, and in particular to personalization of search results.

BACKGROUND OF INVENTION

The current state of the art in online search engines is highly advanced in its ability to retrieve documents (e.g., web pages or portions thereof, images, etc.) that are responsive to the terms of a query. Search engines today can quickly retrieve specific documents that match the terms of the query. However, current search engines often return documents that while accurately correspond to the specific terms of the query, do not in any way reflect the user's underlying interests. Thus, two different users, one who is very interested in sports, and another who is interested in politics, will obtain exactly the same results to a given query, say "drug testing in baseball," even though the first user may be more interested in learning about which teams have implemented drug testing, while the latter user is more interested in learning about legislation related to drug testing in sports. Thus, there is a need for providing a mechanism and methodology for personalizing search results in accordance, with the interests of the users.

Further, while a user may have particular set of interests that may be useful in processing their search query, a user may not want to always have such interests influence the query results. Thus, it would be desirable to a provide a mechanism and a methodology by which the user can variably adjust the degree to which his interests influence the results of a given search query.

SUMMARY OF THE INVENTION

The present invention provides allows a user to variably adjust the degree to which his or her personal interests influence the presentation of results of a given search query. The present invention has multiple embodiments, including a system for providing a search engine, a methodology for processing a search query, and a user interface for the user to variably adjust the degree of influence.

For a user's perspective, the present invention provides a mechanism for personalizing search results. The user defines a set of interests, for example as a set of topics or categories of interest to the user, as an interests profile. The user then submits a search query to a search engine. The search engine retrieves documents that are relevant to the query and presents these as search results. At first (though not necessarily) the search results are ranked without regard to the user's interests. This enables the user to see the relevance of the documents without influence by his personal interests. The user can variably control ranking of the documents in the search result set. In a preferred embodiment, this is done by direct manipulation of graphical control element, a personalization control. This graphical element can have various graphical representations, and in one embodiment it is represented as a slider. Adjusting the control element adjusts the degree to which the results are ranked according to the user's interests, as expressed in his interest profile. In response to changes in the position of the control element, the search results are reranked, thereby allowing the user to see how his interests affect the ordering of the results.

In one embodiment, the ranking of search results operates to increase the relevance score of documents that are associated with the directory of topics. Each topic in the directory is associated with a group of documents (e.g., websites) which are deemed relevant to the topic. For each document (again, website), a boost value is provided which indicates the degree of relevance of the site to the topic. All pages within a given site get that site's boost value. The boost value may be understood as a scaling factor that represents the relevance of the site to the topic. During the query processing, the set of documents is returned, and scored without regard to their inclusion in the topic directory. In addition, a separate score for each document is determined in which the document's underlying relevance score is adjusted by its associated boost value if any, for example by multiplying the relevance score by the boost value, thereby scaling the relevance of the document to the query. Generally, only those documents which belong to sites listed in the directory will have a boosted relevance score, and other documents in the search results will not. The reranking of the documents in accordance with their boosted relevance scores is then a function of the position of the personalization control, either from no influence (where the boost value has no effect on the relevance score) to complete influence, wherein boost value for each document is applied 100% to the relevance score, and any number of intermediate levels of application. The user can thus immediately rerank the documents in the search results by adjusting the position of the control.

A system embodiment includes a topic directory for providing topics (categories) to a user, a search engine and index for searching indexed websites in response to a user's query, and a personalization component for determining for the search results at least one (and preferably a set) of rankings of, the search results in accordance with the user's interests. A user interface embodiment includes a topical directory, with various topics, and graphical controls (e.g., checkboxes) in which the user can select topics of interests, and a graphical control that allows the user to adjust the search result ranking in accordance with his interest profile.

The present invention is next described with respect to various figures and diagrams and technical information. The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

Figure 1:
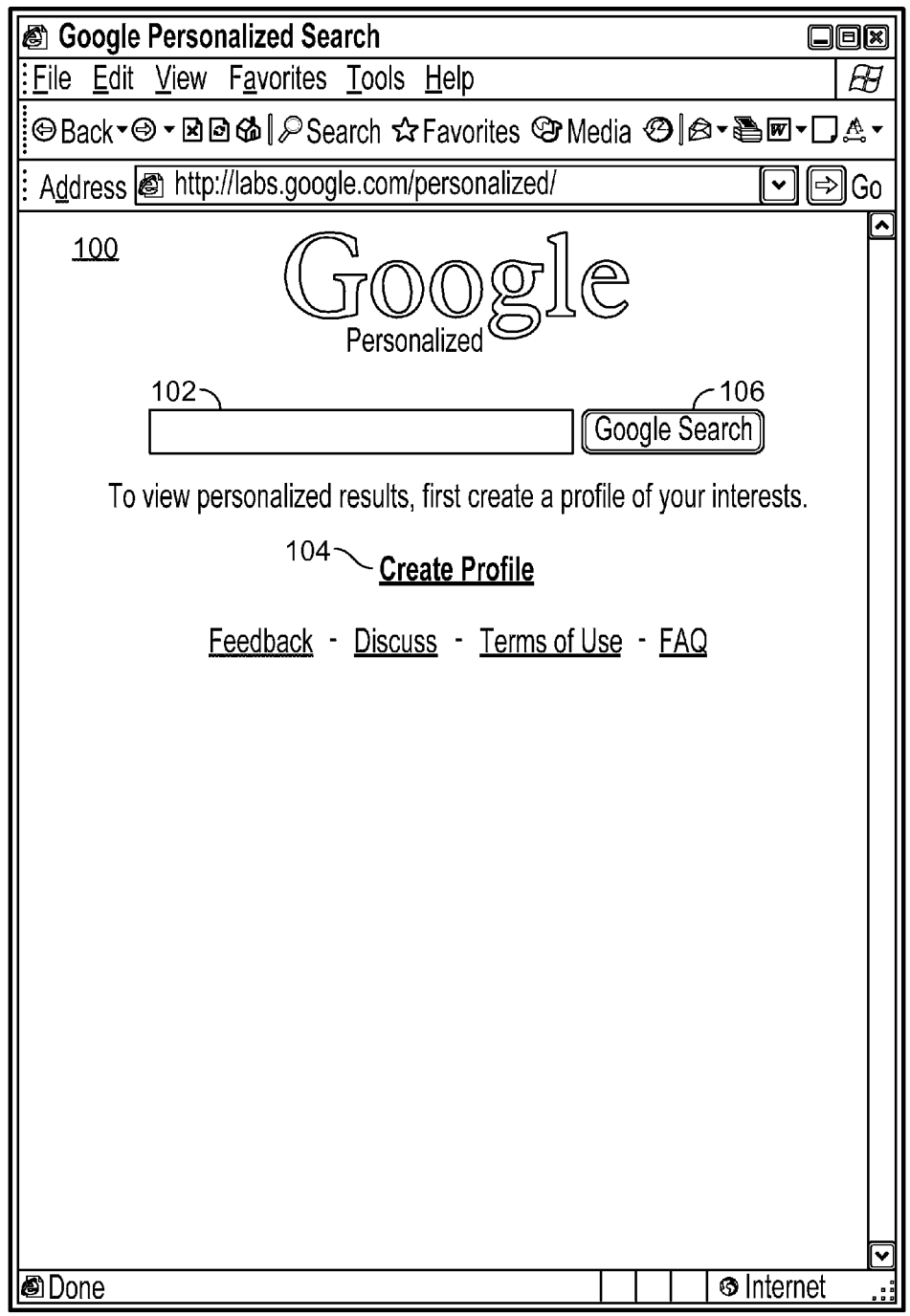
FIG. 1 is an entry web page for a search engine.

Referring now to FIG. 1 there is shown the entry (or landing page) 100 of a search engine. The search engine includes a query entry field 102 in which a user enters the terms of a search query. A search button 106 submits the query to the search engine for processing. The first time the user accesses the search engine, he will not have defined a user profile for personalizing the search results, and a message is displayed to that effect. The user can access the Edit Profile link 104 in order to establish their personal interests.

Clicking on the Edit Profile link 104 accesses the page 200 illustrated in

Figure 2:
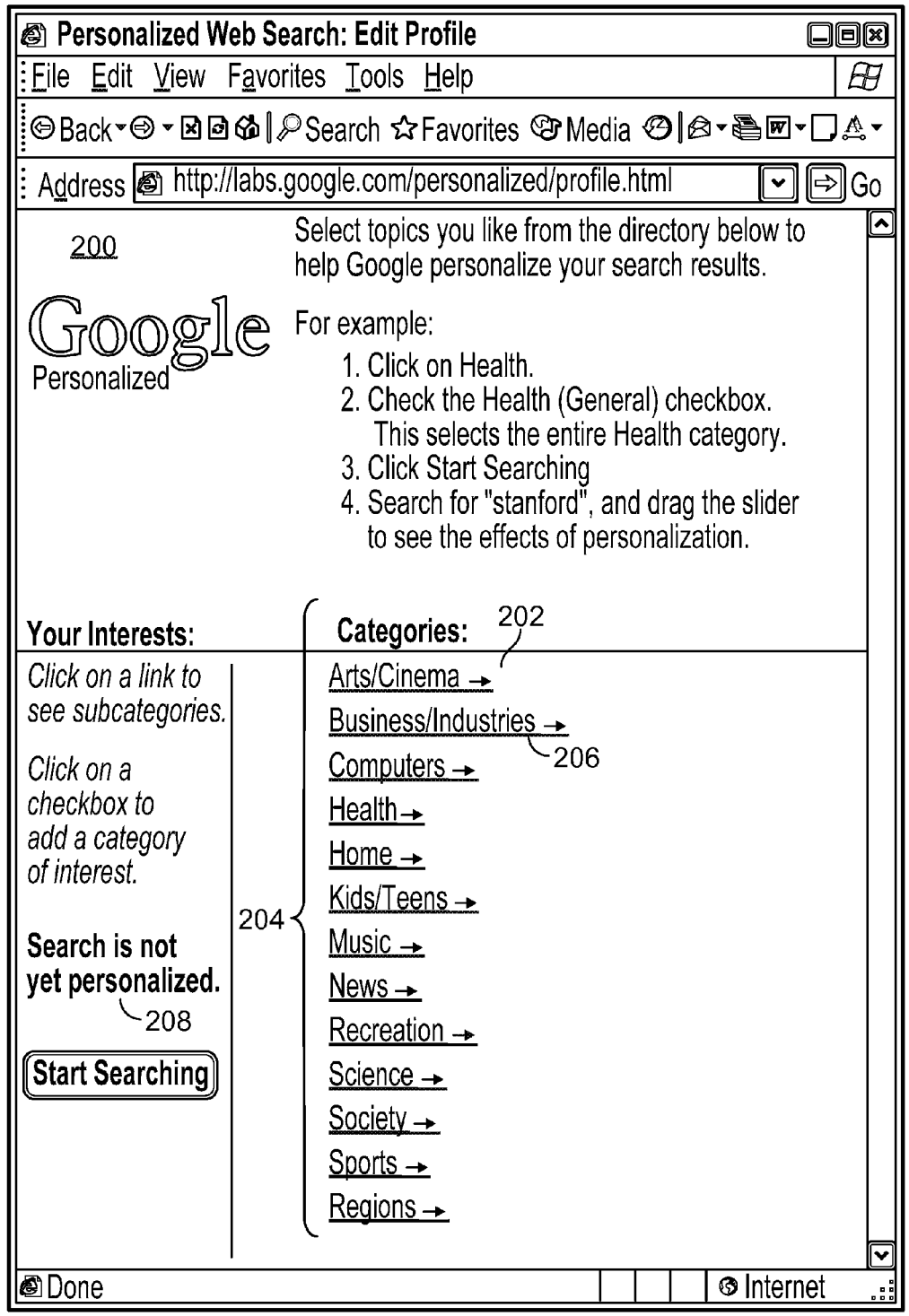
FIG. 2 is web page for editing a user's personal profile of topics.

FIG. 2. This page shows the top level topics 204 of a topical directory 202. The topics in the directory can be, for example, the topics defined in the Open Directory Project, found at http://dmoz.org/ or can be some other topical directory. (In this disclosure the term "topic" and "category" are interchangeable, as are "subtopic" and "subcategory".) The top level topic links may have a set of subtopics, as indicated by the arrows 206. At any time, the user can begin a search by clicking on the Start Searching button 208. Clicking on a particular top level topic takes the user to a page associated with that topic's subtopics.

Figure 3:
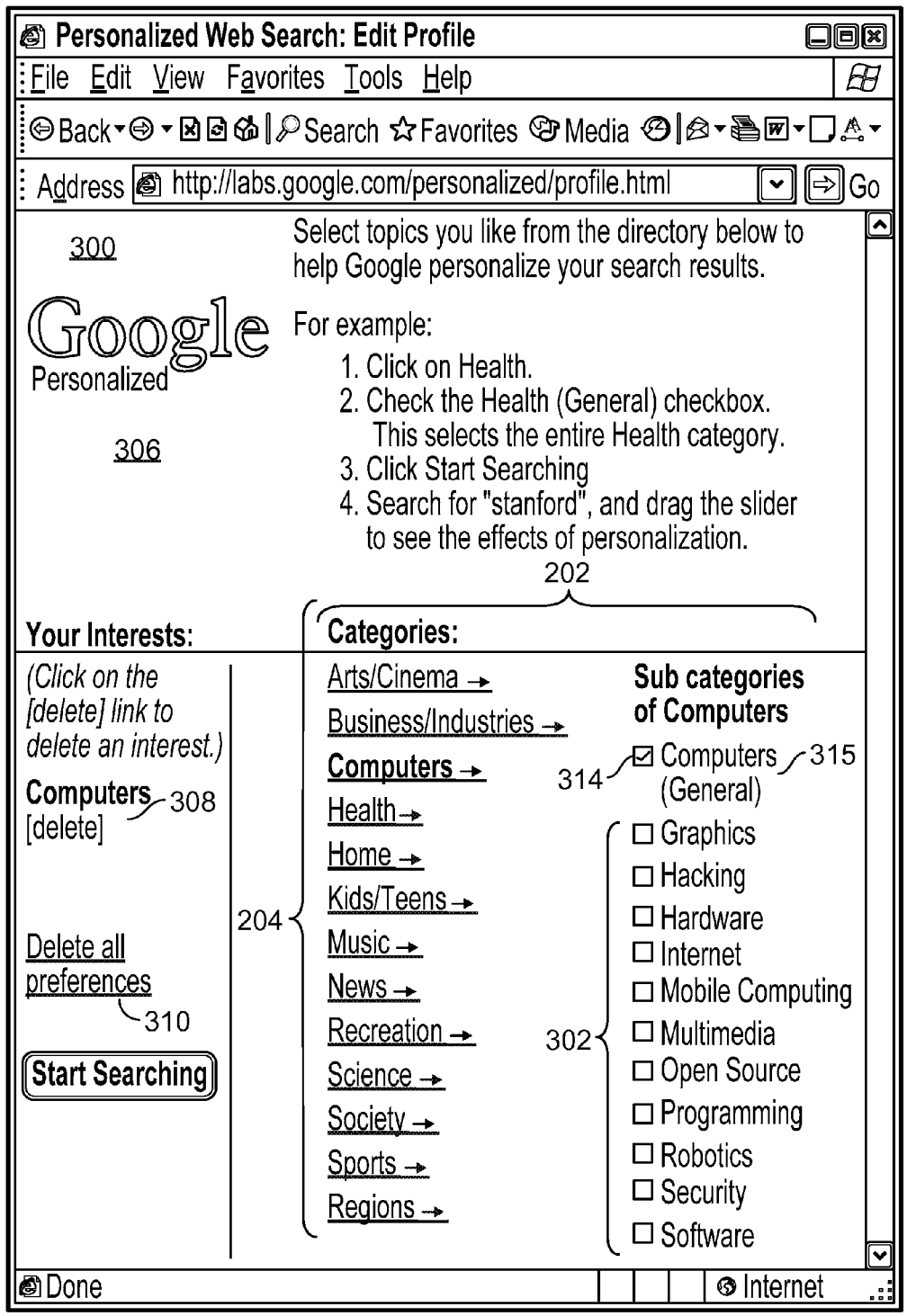
FIG. 3 is another web page of topics, and subtopics.

FIG. 3 illustrates the result of this step, where the user has clicked on the topic "Computers" on page 200. As shown in FIG. 3, the subtopics 302 of the topic "Computers" have been displayed in the right hand column. Next to each subtopic 302 is a checkbox 314. The user can select the checkbox 314 to indicate his interest in a specific subtopic. Alternatively, the user can select the checkbox 316 for the entire subtopic itself, "Computers (General)". This indicates that the user is interested in all of the subtopics of the topic "Computers". The set of topics selected by the user may be called a user profile, a personalization profile, or an interest profile. On the left side of FIG. 3, after the user has selected one or more topics of interest, these topics are listed in the interests field 306. Next to each topic name is a delete link 308 that allows the user to delete individual topics. The user can also delete all topics by selecting the "Delete all preferences" link 310.

Figure 4:
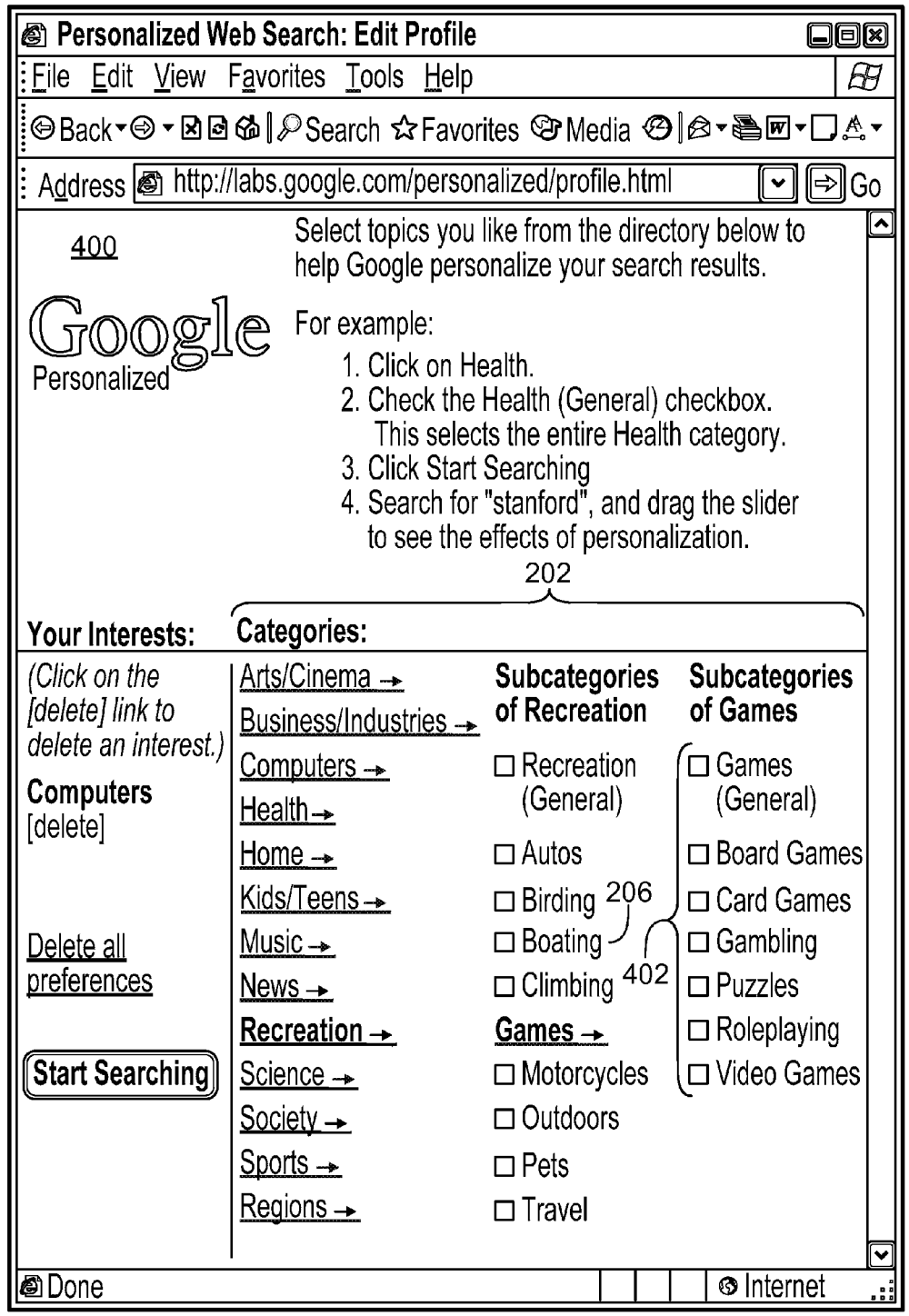
FIG. 4 is another web page of subtopics.

The subtopics themselves can have any number of additional levels of subtopics. For example, FIG. 4 illustrates that the subtopic "Games" has further subtopics 402, "Board Games," "Card Games," etc. These were presented to the user in response to the user clicking on the subtopic arrow 206 next to the "Games" topic label. Again, the user can select either the entire subcategory by selecting checkbox 404, or any of the individual subtopic checkboxes 406. In one embodiment, in addition to the top level topics 204, there are two subtopic levels. This provides sufficient breadth and granularity of topical coverage, without imposing unnecessary computational complexity.

Figure 5:
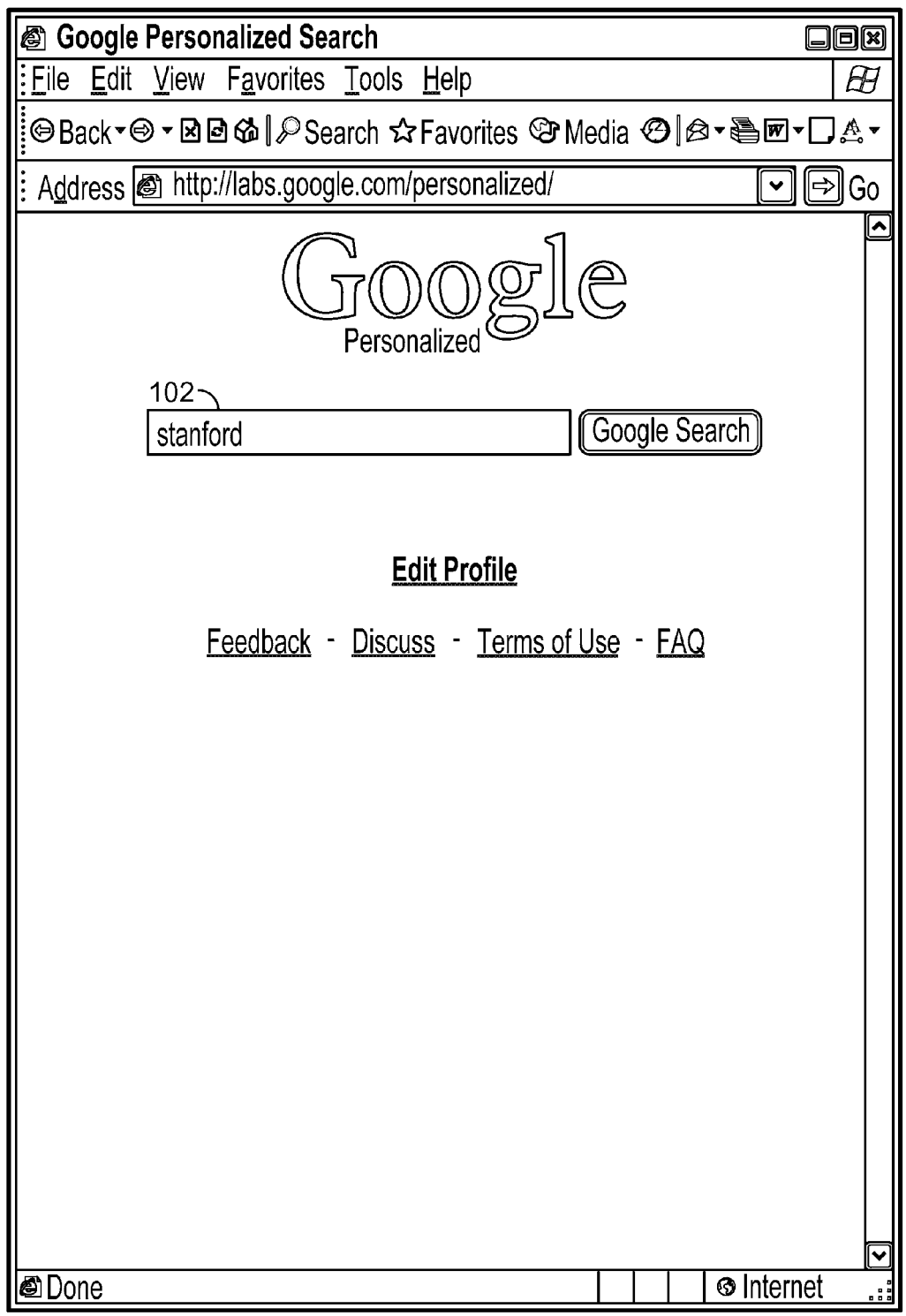
FIG. 5 shows the entry web page for the search engine with the query "stanford".
Figure 6:
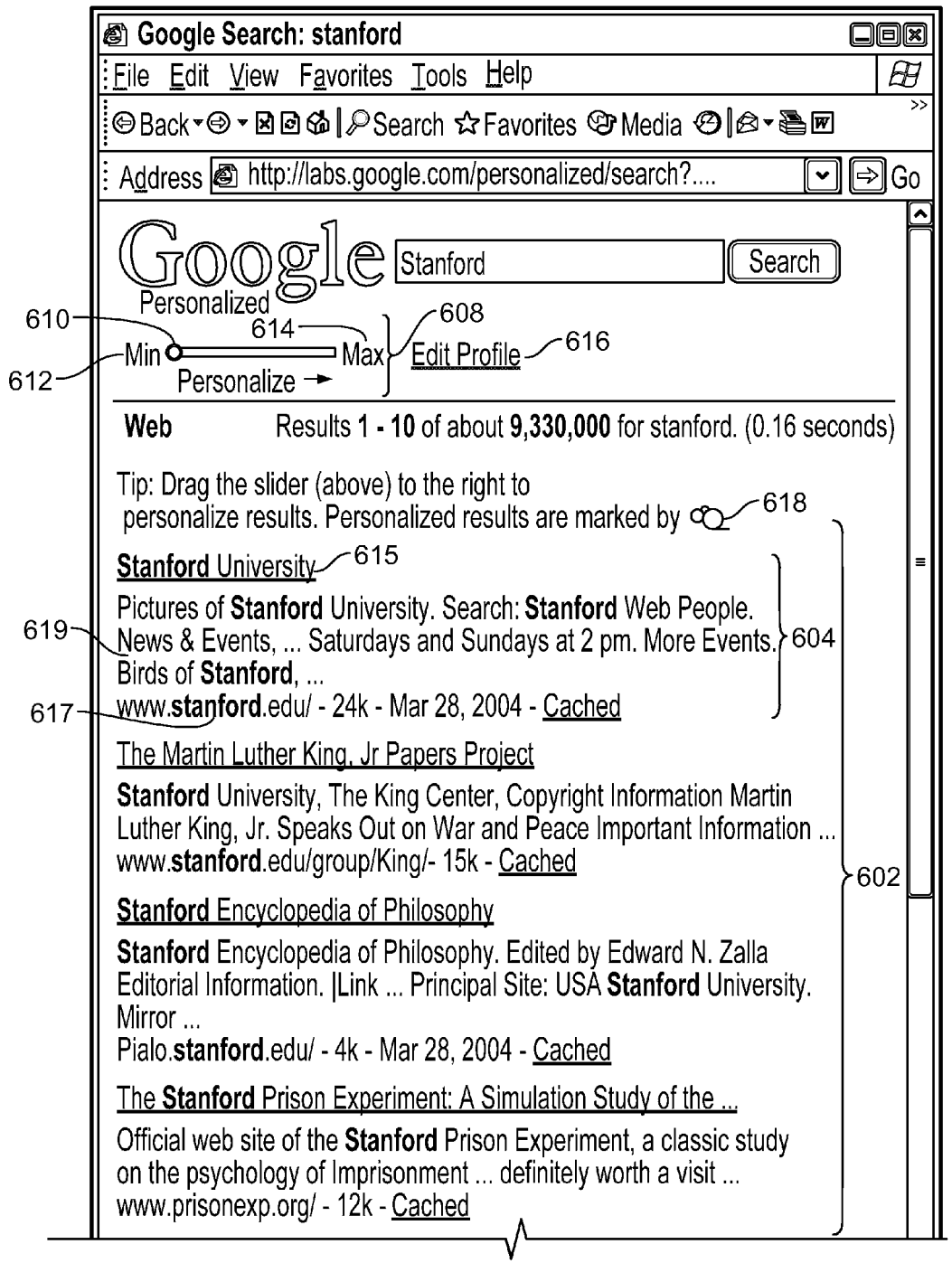
FIG. 6 shows the initial results of the search on query "stanford", along with a control 608 for controlling a degree of influence of the user's interest profile in ranking the search results.

Referring again to FIG. 3, the user has indicated his interest in computers generally. Clicking on the Start Searching button 208 brings up search page 100 again, which no longer shows the message requesting the user to establish a personalization profile. At this point, the user enters a search query in the search field, here the query "stanford", as shown in FIG. 5. The search engine performs a search of its index and provides the search results. FIG. 6 illustrates the initial search results page 600. Here the search results 602 comprise a set of documents 604, each document indicated by a URL 617, along with a link 615 to the page, and a snippet 619 of the page text to show a portion of the context to the document to the user. Near the top of the page is the personalization control 608. In the context of this application, "documents" are understood to be any type of media that can be indexed and retrieved by a search engine, including web pages, images, multimedia files, text documents, PDFs, and so forth. No limitation as to the scope of the invention is implied by the use of the generic term "documents."

The personalization control 608 allows the user to adjust the ranking of the individual documents/pages of the search results with respect to his interests, preferably as expressed in the personalization profile. The personalization control may be explained as controlling a degree of influence or contribution of the user's interest profile to the ranking of the search results. FIG. 6 illustrates the control 608 in an embodiment where it is a slider type control that includes a control handle 610 that is moved along a linear dimension between a minimum value 612 to a maximum value 614. This type of control 608 is generally very intuitive and easy for users to understand how it operates. Alternative embodiments include dial type controls, similarly providing a variable adjustment between a minimum and maximum value, and radio buttons each with an associated predetermined adjustment amount (e.g., five radio buttons, associated respectively with 0%, 20%, 40%, 80%, and 100%). Those of skill in the art of user interface design will appreciate that other types of controls may be implemented to achieve essentially the same effect.

In the example of FIG. 6, the personalization control 608 is set all the way to its minimum value 612. The search results accordingly are ranked on their relevance to the query and query independent information such as PageRank, as disclosed in U.S. Pat. No. 6,285,999, "Method for node ranking in a linked database", which is incorporated by reference herein in its entirety and for all of its teachings. Notice that the search results are generally related to Stanford University.

Figure 7:
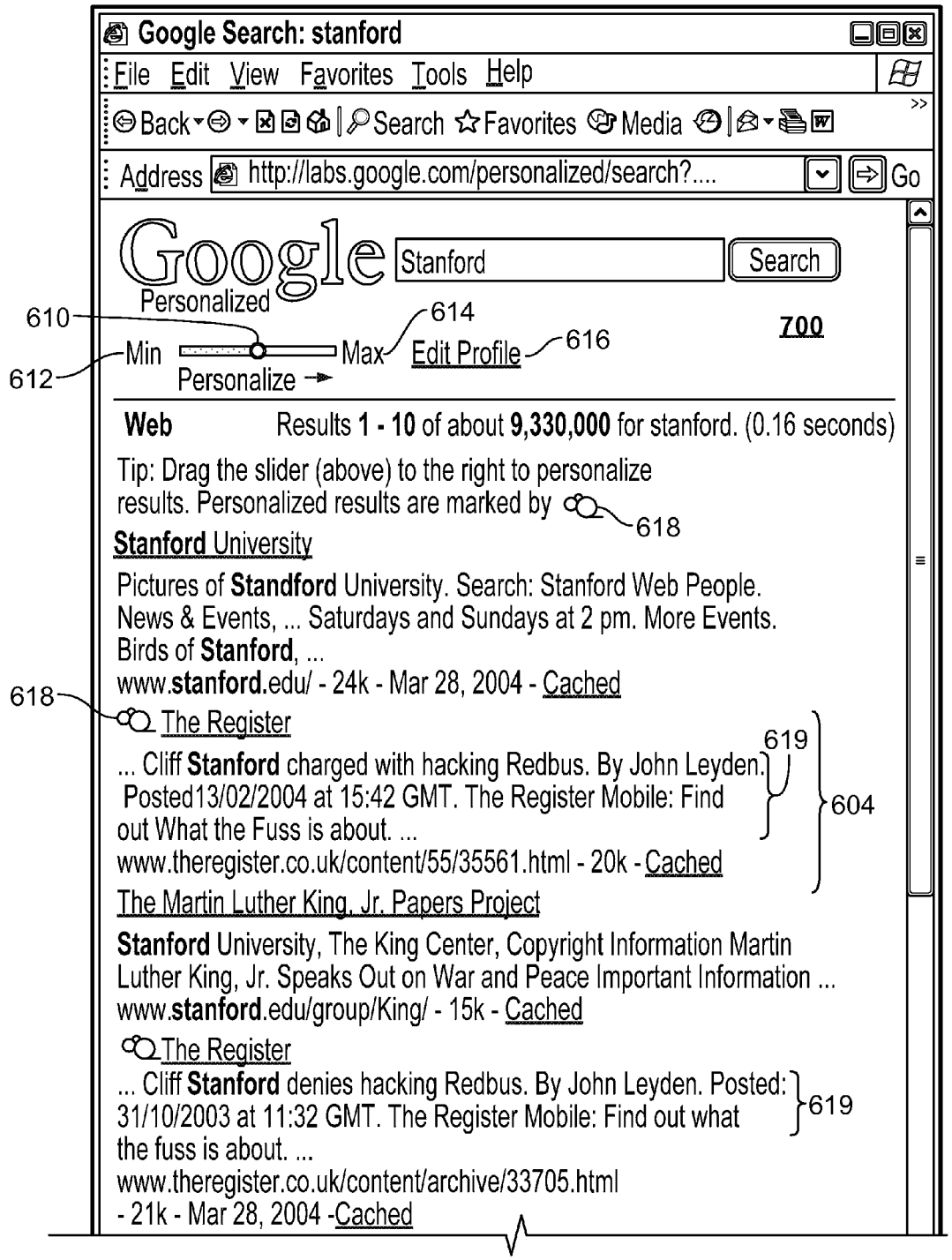
FIG. 7 shows the ranking of the search results of FIG. 6 after the user has adjusted the control 608 to an intermediate position.

Referring now to FIG. 7, there is shown the ranking of the search results 602 after the user has adjusted the slider 610 to an intermediate position about halfway between the minimum and maximum values. Now, the individual documents 604 are reranked, and those that are more related to the user's interest (previously identified as "Computers (General)" are more highly ranked. In order to for the user to distinguish the documents that are more related to his interests, those documents are indicated by a personalization icon 618 next to the link text 615. Notice that with the intermediate position of the slider 610, about every other document is a personalization result, though this is not required. Notice further that the snippet 619 text has text that relates to computers (e.g., "hacking") even though that term was not included in the original search query.

Figure 8:
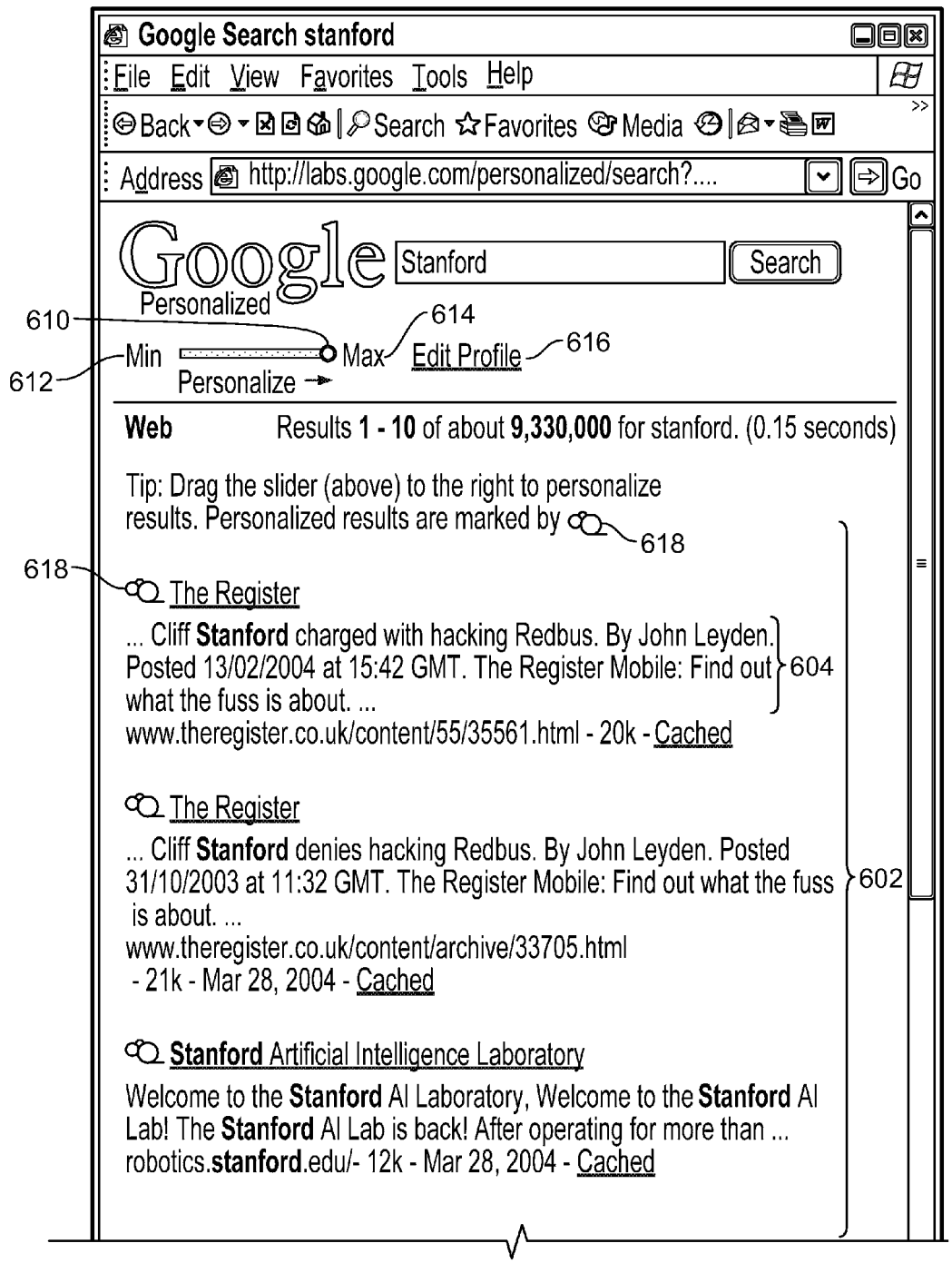
FIG. 8 shows the ranking of the search results of FIG. 6 after the user has adjusted the control 608 to a maximum position.

Referring now to FIG. 8, there is shown the ranking of the search results 602 after the user has adjusted the slider 610 to its maximum position 614. First, in this example all of the documents 604 in the search results 602 reflect the user's personalization profile, and are annotated with the personalization icon 618. Second, the documents in the search results relate to computers and Stanford University, thereby reflecting the user's interests in computers, as it relates to the query "stanford". For example, the first two results are related to "hacking" at Stanford; the next three documents relate specifically to various computer science projects at Stanford. Thus the third document is for Stanford's Artificial Intelligence Laboratory, the fourth document is for Stanford's Center for the Study of Language and Information, and the fifth document is for Stanford's Database Group. The remaining documents are likewise related to the "Computers" interest of the user. Notice further, that what was previously the first (e.g., most relevant) result, the link to Stanford University's home page, when there was no personalization applied (FIG. 6) and when only intermediate personalization was applied (FIG. 7), no longer even appears in the top eight results.

In the examples of FIGS. 6-8 the user can dynamically adjust the ranking of the documents in real time, without the search engine having to recompute the search results. This further aids the user's ability to explore the search results.

Figure 9:
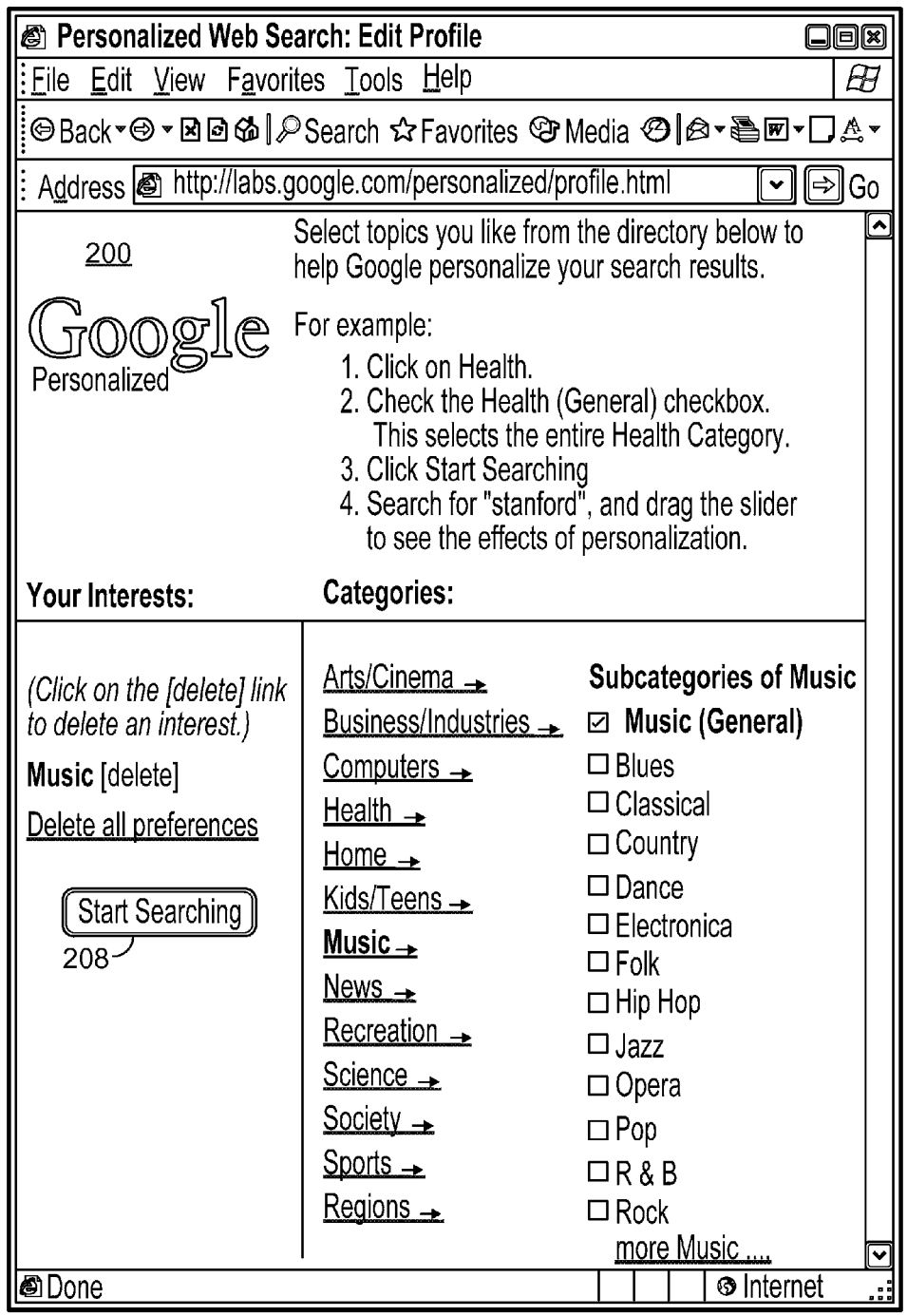
FIG. 9 shows a web page of topics after deletion of a "Computer" topic and selection of a "Music" topic by the user.
Figure 10:
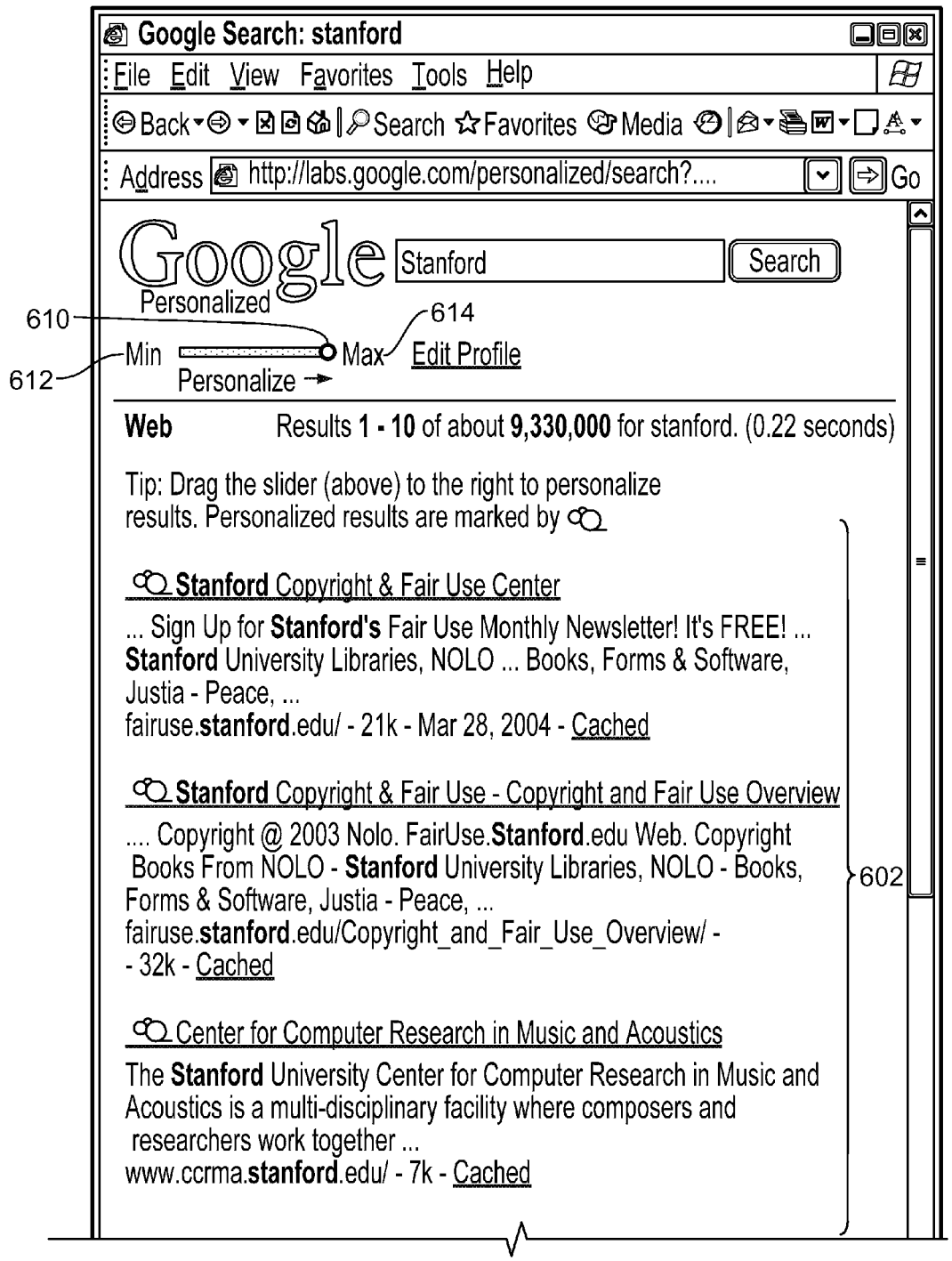
FIG. 10 shows the ranking of the search results of FIG. 6 following the change in topic interests in FIG. 9.

As shown on FIGS. 6-8, an Edit Profile link 616 allows the user to edit the interests in his user profile at any time. FIG. 9 illustrates where the user has returned to the topic directory page 200 as illustrated in FIG. 2, and deleted his existing topic interest in Computers, and created a different interest in "Music". The user then again selects the Start Searching button 208. The search engine provides an updated set of search results, which documents will be the same as before, since the query term has not changed. However, as of the last search, the user has positioned the control 610 for full personalization, and hence the search engine applies this setting and ranks the documents according the existing (and new) personalization profile, this time for "Music." FIG. 10 illustrates the dramatic difference this makes in the search results. Here, the top six results are all related to music and arts, and none of the previous results relating to computers make the top of the search result list. This shows how the user's personalization profile can significantly alter the ranking of a given set of documents.

In one embodiment of the invention, the personalization of search results is provided by the following methodology. Those of skill in the art of search engine design can readily understanding the basic structure of a search engine and its operation in which this methodology can be implemented.

1) When the user selects topics (categories), they are added to a cookie containing a list of his interests IN (where IN is short for "interests"). The interests can be expressed as either text tokens (e.g. "computers"), or as indices into a directory, where each topic/subtopic has an index number. When the user accesses the site, the system retrieves this interest list from the cookie. Alternatively, the site can provide a user registration page, in which the user registers with a user name and password, and the user's interests are stored at the search engine site in a database, and retrieved in response to the user login.

2) Each time the user issues a search query Q, the list IN is sent to a frontend web server.

3) Then the frontend web server issues two requests to a backend search engine (Q, null) and (Q, IN), which returns to the frontend web server two results sets, R_base (normal) and R_in (personalized), respectively.

4) The base query (Q null) is the same as searching for Q on the search engine without any personalization, so R_base is the result set that the search engine would normally return in response to the query. As noted above, the search results accordingly are ranked on their relevance to the query and any other factors, such as PageRank, as disclosed in U.S. Pat. No. 6,285,999, "Method for node ranking in a linked database", which is incorporated by reference herein in its entirety and for. all of its teachings.

5) The personalized query (Q, IN) contains the user's interest list. The search engine follows a similar processing control flow as a normal query, but it activates a personalization component during the scoring function, which "boosts" documents that are relevant to the set of interests IN.

In one embodiment of the invention, these boosts are implemented using a set of maps (one map for each topic/subtopic in the directory), of the form:

{Site→boost}

So for example, the category "Health" has a map of the form

{Site→boost} which contains entries such as:

nih.gov→5.8 cdc.gov--:>7.9 med.stanford.edu→3.5 where nih.gov, cdc.gov, and med.Stanford.edu are various sites that have been determined (either manually or automatically) to be related to the topic "Health". In other words, for each topic in the directory, there is a set of sites that have been determined to be relevant to the topic, and for each of these sites, a boost value is defined.

The boost for the sites listed in the topical directory is generally determined as follows:

a) A "site graph" is generated where nodes of the graph are sites (basically, pages on the same host) and edges between nodes are weighted based on the number of pages from one site that link to pages on another. This same type of graph can be used to compute all topic boost maps.

b) For each topic in the directory, say "Health", a number of sites are selected as "start sites" S0 whose home page is listed in the Open Directory. For example, for a university like Stanford, start sites may be selected as any site ending in .stanford.edu.

c) A computation is run in two passes:

i) first identify a set of sites 51 that are linked-to heavily by those sites in S0, with each site in S1 assigned a weight according to how heavily it's linked-to by sites in S0.

ii) then identify those sites S2 that are linked-to heavily by those sites in S1, weighted as with S1.

d) The sites in S2 are boosted with their assigned weights.

When a personalized query comes in with an interest set (e.g., {Health, Music}), then the personalization component consults the respective maps, and then for query results (i.e. documents) that are in these maps, the personalization components boosts the IR score for them, so that they would get ranked higher. The IR score is the information retrieval score that the search engine provides for each document, and can be a function of document relevance and other factors, such as PageRank.

For example if http://www.med.stanford.edu/research/ were one of the results for query Q, and IN included "Health," then that result would get a multiplicative boost of 3.5 to its IR score, because that page is on the site med.stanford.edu. For multiple interests, the values in the corresponding maps are multiplied together for a combined effect. Further details of one implementation for determining the boost for sites in the directory boost map are described in U.S. patent application Ser. No. 10/646,331 incorporated by reference herein.

6) The frontend web server receives R_base and R_in. R_base represents the results 602 the user sees when the personalization control 608 is set at 0 (or its minimum position 612). R_in represents the results 602 the user sees when the slider is at its maximum position 61 4, e.g. 10. In one embodiment, the control has 11 positions, but any number of positions may be used. The rankings that are shown to the user between 0 and 10 are interpolated; this means using R_base and R_in, the personalization component constructs intermediate rankings (R) . . . R__9) by moving each individual result along a virtual path "from its position when the control 608 is at its minimum position to when the control 608 is at its maximum position.

7) How the slider effect is provided to the user:

The frontend web server appends the results in°R_in that are not in R_base to R_base to get a list of all unique results (either in R_base or R_in) called R_all. The frontend web server then assigns consecutive identification numbers to the results in R_all that serve as identifiers. The frontend then sends to the user's browser two items:

a) the mapping lid→result} for each of the results in R_all, containing for each document in the results its identification number; and b} N vectors that denote the rankings the user should see, in terms of result IDs, where N is the number of positions of the slider, and each vector represents the ordering of the results based on the degree of personalization. In this example, there would be 11 vectors corresponding to positions 0 through 10 of the control 608. In one embodiment Vector 0 is [0, 1, 2, 3, 4, 5, 6, 7, 8, 9, 10], reflecting the un-personalized ranking of the results, assigned with the local IDs starting with R_O. Vector 10 is the ordering in the fully personalized results R_in; for instance, it might be [15, 17, 5, 0, 1, 2, 3, 4, 8, 9, 10], where documents 15 and 17, for example, are documents in the relevant map of the topic directory whose IR score was boosted according to the boost values in the map, and the value associated with the control 608's position. Transmitting the N ranking vectors to the client allows the client browser to quickly recomputed the rankings, rather than imposing that calculation on the server.

8) Finally, Javascript code in the result page causes the user's browser to reorder the search results using the appropriate one of the 11 positional ranking vectors in response to the user changing. the position of the control 608. Further details of one embodiment of steps 6-8, above, are described in U.S. application Ser. No. 10/641,489, incorporated by reference herein.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. Those of skill in the art of integrated circuit design and video codecs appreciate that the invention can be readily fabricated in various types of integrated circuits based on the above functional and structural descriptions, including application specific integrated circuits (ASIC). In addition, the present invention may be incorporated into various types of video coding devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter.

Accordingly, the disclosure of the present invention is intended to be illustrative, but not limiting, of the scope of the invention.

What is claimed is:

1. A computer-implemented method comprising:
   receiving, at a user device, a search results page that presents search results identified in response to a first search query,
   wherein the search results page includes a first representation of a first ranking of one or more of the search results based on first ranking scores of the search results, and a second representation of a second ranking of one or more of the search results based on second ranking scores of the search results,
   wherein the first ranking scores are based on a first degree of influence of a topic of a user interest profile on an initial ranking of the search results,
   wherein the second ranking scores are based on a different second degree of influence of the topic of the user interest profile on the initial ranking of the search results,
   wherein the second ranking scores are different than the first ranking scores,
   wherein the second ranking scores include a boosted IR score for a second search result in the second search results, and the boosted IR score is determined by:
      determining an initial information retrieval (IR) score for the second search result of the second search results, wherein the second search result identifies a resource on a site,
      determining that the site is associated with a topic-specific boost value for the topic, wherein the topic-specific boost value is based on a number of links to the site from one or more other sites that have been determined to be relevant to the topic, and
      determining the boosted IR score for the second search result using the topic-specific boost value; and
   wherein the search results page includes a user interface control that allows a user to select a degree of influence of the topic on the initial ranking of the search results;
   presenting the search results according to the first representation of the first ranking based on the first ranking scores;
   determining that a user selection of the user interface control of the search results page corresponds to the second degree of influence of the topic of the user interest profile on the initial ranking of the search results; and
   in response to determining that the user selection of the user interface control corresponds to the second degree of influence of the topic of the user interest profile on the initial ranking of the search results,
      presenting the search results on the search results page according to the second representation of the second ranking based on the second ranking scores without resubmitting a search query to a search engine to obtain the search results.

2. The method of claim 1, wherein the search results page includes a mapping between search results and respective search result identifiers, and wherein presenting the search results according to the first representation of the first ranking includes obtaining, from the mapping, search results referenced by search result identifiers occurring in the first representation of the first ranking.

3. The method of claim 1, wherein the first ranking scores correspond to a ranking of the search results for a minimum degree of influence of the topic of the user interest profile on the initial ranking of the search results.

4. The method of claim 3, wherein the first ranking of the search results corresponds to the initial ranking of the search results.

5. The method of claim 1, wherein the second ranking scores correspond to a ranking of the search results for a maximum degree of influence of the topic of the user interest profile on the initial ranking of the search results.

6. The method of claim 1, further comprising:
   receiving a third representation of a third ranking of the search results that is based on interpolated third ranking scores between the first ranking scores and the second ranking scores for a different third degree of influence of the topic of the user interest profile on the initial ranking of the search results;
   determining that a user selection of the user interface control of the search results page corresponds to the third degree of influence; and
   in response to determining that a user selection of the user interface control of the search results page corresponds to the third degree of influence, presenting the search results according to the third representation of the third ranking based on the interpolated third ranking scores.

7. The method of claim 1, where the first representation of the first ranking comprises a vector of search result identifiers.

8. A system comprising:
   one or more computers and one or more storage devices storing instructions that are operable, when executed by the one or more computers, to cause the one or more computers to perform operations comprising:
   receiving, at a user device, a search results page that presents search results identified in response to a first search query,
   wherein the search results page includes a first representation of a first ranking of one or more of the search results based on first ranking scores of the search results, and a second representation of a second ranking of one or more of the search results based on second ranking scores of the search results,
   wherein the first ranking scores are based on a first degree of influence of a topic of a user interest profile on an initial ranking of the search results,
   wherein the second ranking scores are based on a different second degree of influence of the topic of the user interest profile on the initial ranking of the search results,
   wherein the second ranking scores are different than the first ranking scores,
   wherein the second ranking scores include a boosted IR score for a second search result in the second search results, and the boosted IR score is determined by:
      determining an initial information retrieval (IR) score for the second search result of the second search results, wherein the second search result identifies a resource on a site,
      determining that the site is associated with a topic-specific boost value for the topic, wherein the topic-specific boost value is based on a number of links to the site from one or more other sites that have been determined to be relevant to the topic, and
      determining the boosted IR score for the second search result using the topic-specific boost value; and wherein the search results page includes a user interface control that allows a user to select a degree of influence of the topic on the initial ranking of the search results;

presenting the search results according to the first representation of the first ranking based on the first ranking scores;

determining that a user selection of the user interface control of the search results page corresponds to the second degree of influence of the topic of the user interest profile on the initial ranking of the search results; and in response to determining that the user selection of the user interface control corresponds to the second degree of influence of the topic of the user interest profile on the initial ranking of the search results, presenting the search results on the search results page according to the second representation of the second ranking based on the second ranking scores without resubmitting a search query to a search engine to obtain the search results.

9. The system of claim 8, wherein the search results page includes a mapping between search results and respective search result identifiers, and wherein presenting the search results according to the first representation of the first ranking includes obtaining, from the mapping, search results referenced by search result identifiers occurring in the first representation of the first ranking.

10. The system of claim 8, wherein the first ranking scores correspond to a ranking of the search results for a minimum degree of influence of the topic of the user interest profile on the initial ranking of the search results.

11. The system of claim 10, wherein the first ranking of the search results corresponds to the initial ranking of the search results.

12. The system of claim 8, wherein the second ranking scores correspond to a ranking of the search results for a maximum degree of influence of the topic of the user interest profile on the initial ranking of the search results.

13. The system of claim 8, wherein the operations further comprise:

receiving a third representation of a third ranking of the search results that is based on interpolated third ranking scores between the first ranking scores and the second ranking scores for a different third degree of influence of the topic of the user interest profile on the initial ranking of the search results;

determining that a user selection of the user interface control of the search results page corresponds to the third degree of influence; and in response to determining that a user selection of the user interface control of the search results page corresponds to the third degree of influence, presenting the search results according to the third representation of the third ranking based on the interpolated third ranking scores.

14. The system of claim 8, where the first representation of the first ranking comprises a vector of search result identifiers.

15. A computer program product, encoded on one or more non-transitory computer storage media, comprising instructions that when executed by one or more computers cause the one or more computers to perform operations comprising:

receiving, at a user device, a search results page that presents search results identified in response to a first search query, wherein the search results page includes a first representation of a first ranking of one or more of the search results based on first ranking scores of the search results, and a second representation of a second ranking of one or more of the search results based on second ranking scores of the search results, wherein the first ranking scores are based on a first degree of influence of a topic of a user interest profile on an initial ranking of the search results, wherein the second ranking scores are based on a different second degree of influence of the topic of the user interest profile on the initial ranking of the search results, wherein the second ranking scores are different than the first ranking scores, wherein the second ranking scores include a boosted IR score for a second search result in the second search results, and the boosted IR score is determined by:

determining an initial information retrieval (IR) score for the second search result of the second search results, wherein the second search result identifies a resource on a site, determining that the site is associated with a topic-specific boost value for the topic, wherein the topic-specific boost value is based on a number of links to the site from one or more other sites that have been determined to be relevant to the topic, and determining the boosted IR score for the second search result using the topic-specific boost value; and wherein the search results page includes a user interface control that allows a user to select a degree of influence of the topic on the initial ranking of the search results;

presenting the search results according to the first representation of the first ranking based on the first ranking scores;

determining that a user selection of the user interface control of the search results page corresponds to the second degree of influence of the topic of the user interest profile on the initial ranking of the search results; and in response to determining that the user selection of the user interface control corresponds to the second degree of influence of the topic of the user interest profile on the initial ranking of the search results, presenting the search results on the search results page according to the second representation of the second ranking based on the second ranking scores without resubmitting a search query to a search engine to obtain the search results.

16. The computer program product of claim 15, wherein the search results page includes a mapping between search results and respective search result identifiers, and wherein presenting the search results according to the first representation of the first ranking includes obtaining, from the mapping, search results referenced by search result identifiers occurring in the first representation of the first ranking.

17. The computer program product of claim 15, wherein the first ranking scores correspond to a ranking of the search results for a minimum degree of influence of the topic of the user interest profile on the initial ranking of the search results.

18. The computer program product of claim 17, wherein the first ranking of the search results corresponds to the initial ranking of the search results.

19. The computer program product of claim 15, wherein the second ranking scores correspond to a ranking of the search results for a maximum degree of influence of the topic of the user interest profile on the initial ranking of the search results.

20. The computer program product of claim 15, wherein the operations further comprise:

receiving a third representation of a third ranking of the search results that is based on interpolated third ranking scores between the first ranking scores and the second ranking scores for a different third degree of influence of the topic of the user interest profile on the initial ranking of the search results;

determining that a user selection of the user interface control of the search results page corresponds to the third degree of influence; and in response to determining that a user selection of the user interface control of the search results page corresponds to the third degree of influence, presenting the search results according to the third representation of the third ranking based on the interpolated third ranking scores.

21. The computer program product of claim 15, where the first representation of the first ranking comprises a vector of search result identifiers.

\* \* \* \* \*